United States Patent
Liu et al.

(10) Patent No.: US 9,384,763 B1
(45) Date of Patent: Jul. 5, 2016

(54) DUAL FREE LAYER MAGNETIC READER HAVING A REAR BIAS STRUCTURE INCLUDING A SOFT BIAS LAYER

(71) Applicant: Western Digital (Fremont), LLC, Fremont, CA (US)

(72) Inventors: Feng Liu, San Ramon, CA (US); Daniele Mauri, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/670,340

(22) Filed: Mar. 26, 2015

(51) Int. Cl.
*G11B 5/39* (2006.01)

(52) U.S. Cl.
CPC .................................. *G11B 5/3932* (2013.01)

(58) Field of Classification Search
CPC ...... G11B 5/39; G11B 5/3903; G11B 5/3906; G11B 5/3932; G11B 5/3945; G11B 5/3948; G11B 5/3951; G11B 5/3954
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |

(Continued)

OTHER PUBLICATIONS

Robert Lamberton, et al., "Current-in-Plane GMR Trilayer Head Design for Hard-Disk Drives: Characterization and Extendibility," IEEE Transactions on Magnetics, vol. 43, No. 2, Feb. 2007, pp. 645-650.

*Primary Examiner* — Will J Klimowicz

(57) ABSTRACT

A method and system provide a magnetic read apparatus having an air-bearing surface (ABS). The read apparatus includes a read sensor, a side bias structure and a rear magnetic bias structure. The read sensor includes first and second free layers, a spacer layer and a rear surface opposite to the ABS. The spacer layer is nonmagnetic and between the first and second free layers. The side bias structure is adjacent to the side surface(s) and magnetically biases the first and second free layers to be antiferromagnetically aligned. The rear magnetic bias structure biases the free layers in a scissor mode. The read sensor is between the ABS and the rear magnetic bias structure. The rear magnetic bias structure includes a rear soft magnetic bias structure having a saturation magnetization-thickness product of at least one milli-emu/cm$^2$ and not more than three milli-emu/cm$^2$.

21 Claims, 8 Drawing Sheets

(56) References Cited

U.S. PATENT DOCUMENTS

| | | |
|---|---|---|
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |

(56) References Cited

U.S. PATENT DOCUMENTS

| | | |
|---|---|---|
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,126,795 B2 | 10/2006 | Funayama et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |

(56) References Cited

U.S. PATENT DOCUMENTS

| | | |
|---|---|---|
| 7,595,967 B1 | 9/2009 | Moon et al. |
| 7,615,996 B1 | 11/2009 | Machita et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,826,179 B2 | 11/2010 | Shimazawa et al. |
| 7,829,264 B1 | 11/2010 | Wang et al. |
| 7,839,606 B2 | 11/2010 | Jayasekara |
| 7,843,668 B2 | 11/2010 | Machita et al. |
| 7,846,643 B1 | 12/2010 | Sun et al. |
| 7,855,854 B2 | 12/2010 | Hu et al. |
| 7,855,859 B2 | 12/2010 | Hara et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,881,023 B2 | 2/2011 | Machita et al. |
| 7,894,167 B2 | 2/2011 | Kanaya et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,974,048 B2 | 7/2011 | Shimazawa et al. |
| 7,982,989 B1 | 7/2011 | Shi et al. |
| 8,008,912 B1 | 8/2011 | Shang |
| 8,012,804 B1 | 9/2011 | Wang et al. |
| 8,014,108 B2 | 9/2011 | Shimazawa et al. |
| 8,015,692 B1 | 9/2011 | Zhang et al. |
| 8,015,694 B2 | 9/2011 | Carey et al. |
| 8,018,677 B1 | 9/2011 | Chung et al. |
| 8,018,678 B1 | 9/2011 | Zhang et al. |
| 8,018,691 B2 | 9/2011 | Gill et al. |
| 8,023,230 B2 | 9/2011 | Machita et al. |
| 8,024,748 B1 | 9/2011 | Moravec et al. |
| 8,049,997 B2 | 11/2011 | Miyauchi et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,094,420 B2 | 1/2012 | Ayukawa et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,130,475 B2 | 3/2012 | Kawamori et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,144,437 B2 | 3/2012 | Miyauchi et al. |
| 8,146,236 B1 | 4/2012 | Luo et al. |
| 8,147,994 B2 | 4/2012 | Matsuzawa et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,179,642 B2 | 5/2012 | Kawamori et al. |
| 8,191,237 B1 | 6/2012 | Luo et al. |
| 8,194,363 B2 | 6/2012 | Hara et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,225,489 B2 | 7/2012 | Miyauchi et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,274,764 B2 | 9/2012 | Hara et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,369,048 B2 | 2/2013 | Miyauchi et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |

(56) References Cited

U.S. PATENT DOCUMENTS

| | | |
|---|---|---|
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,477,461 B2 | 7/2013 | Chou et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 * | 12/2013 | Shang ............... H01F 10/3254 360/324.12 |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 9,076,468 B1 * | 7/2015 | Keener ............... G11B 5/3932 |
| 2002/0024777 A1 | 2/2002 | Funayama et al. |
| 2007/0217077 A1 | 9/2007 | Kanaya et al. |
| 2007/0285849 A1 | 12/2007 | Jayasekara |
| 2009/0073616 A1 | 3/2009 | Shimazawa et al. |
| 2009/0135529 A1 | 5/2009 | Shimazawa et al. |
| 2009/0168264 A1 | 7/2009 | Hara et al. |
| 2009/0190272 A1 | 7/2009 | Machita et al. |
| 2009/0201612 A1 | 8/2009 | Shimazawa et al. |
| 2009/0213502 A1 | 8/2009 | Miyauchi et al. |
| 2009/0273864 A1 | 11/2009 | Machita et al. |
| 2009/0290264 A1 | 11/2009 | Ayukawa et al. |
| 2010/0027168 A1 | 2/2010 | Chou et al. |
| 2010/0053820 A1 | 3/2010 | Miyauchi et al. |
| 2010/0079917 A1 | 4/2010 | Miyauchi et al. |
| 2010/0103562 A1 | 4/2010 | Machita et al. |
| 2010/0103563 A1 | 4/2010 | Machita et al. |
| 2010/0149689 A1 | 6/2010 | Tsuchiya et al. |
| 2010/0214696 A1 | 8/2010 | Matsuzawa et al. |
| 2010/0214700 A1 | 8/2010 | Hara et al. |
| 2010/0232066 A1 | 9/2010 | Hara et al. |
| 2010/0232073 A1 | 9/2010 | Chou et al. |
| 2010/0290157 A1 | 11/2010 | Zhang et al. |

(56) References Cited

U.S. PATENT DOCUMENTS

| | | |
|---|---|---|
| 2011/0051291 A1 | 3/2011 | Miyauchi et al. |
| 2011/0069417 A1 | 3/2011 | Kawamori et al. |
| 2011/0086240 A1 | 4/2011 | Xiang et al. |
| 2011/0091744 A1 | 4/2011 | Kawamori et al. |
| 2011/0232079 A1 | 9/2011 | Miyauchi et al. |
| 2011/0235216 A1 | 9/2011 | Lin |
| 2011/0317313 A1 | 12/2011 | Miyauchi et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2015/0002961 A1* | 1/2015 | Keener ............. G11B 5/3163 360/235.4 |
| 2015/0154990 A1* | 6/2015 | Jiang ................ G11B 5/3903 428/811.2 |
| 2015/0154991 A1* | 6/2015 | Le .................... G11B 5/3906 360/97.11 |

\* cited by examiner

ABS View

DUAL FREE LAYER MAGNETIC READER HAVING A REAR BIAS STRUCTURE INCLUDING A SOFT BIAS LAYER

BACKGROUND

FIG. 1 depicts an air-bearing surface (ABS) view of a conventional read transducer used in magnetic recording technology applications. The conventional read transducer 10 includes shields 12 and 18, insulator 14, magnetic bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. If the sensor 20 is to be used in a current perpendicular to plane (CPP) configuration, then current is driven in a direction substantially perpendicular to the plane of the layers 22, 24, 26, and 28. Conversely, in a current-in-plane (CIP) configuration, then conductive leads (not shown) would be provided on the magnetic bias structures 16. The magnetic bias structures 16 are used to magnetically bias the free layer 28.

Although the conventional transducer 10 functions, there are drawbacks. The trend in magnetic recording is to higher density memories. The conventional read sensor 20 may not adequately read high density media. As a result, dual free layer magnetic read sensors have been developed. In such read sensors, two free layers that are biased in a scissor state by a hard magnet. The read sensor may not, however, be reliable in such a conventional magnetic reader. Such reliability issues may become particularly acute at high densities and lower track widths on the order of less than or equal to twenty nanometers. For example, in such high density dual free layer readers, the state in which the free layers are biased may be unpredictable. Accordingly, what is needed is a system and method for improving the performance of a magnetic recording read transducer.

DETAILED DESCRIPTION OF THE PREFERRED EMBODIMENTS

Figure 1:
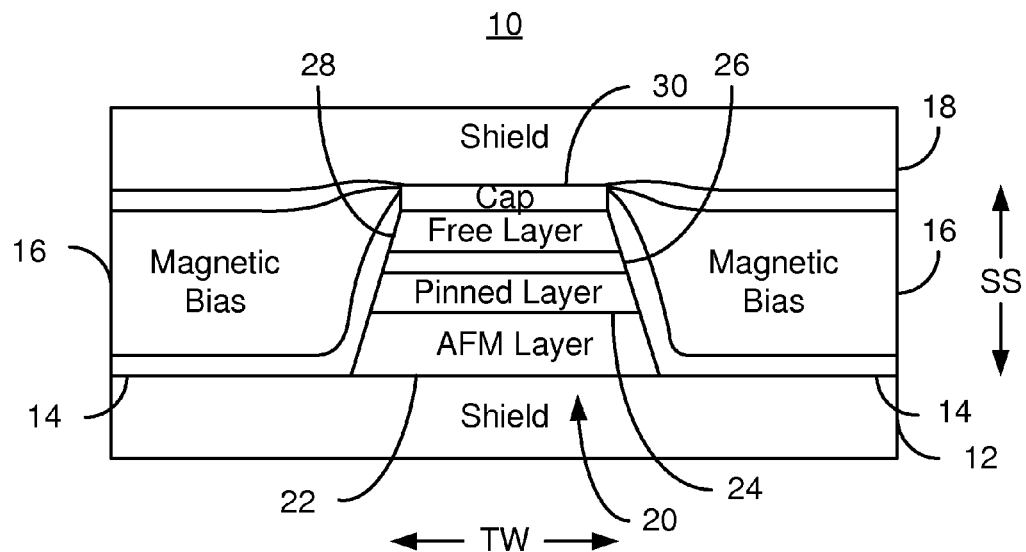
FIG. 1 depicts an ABS view of a conventional magnetic recording read transducer.
Figure 2A:
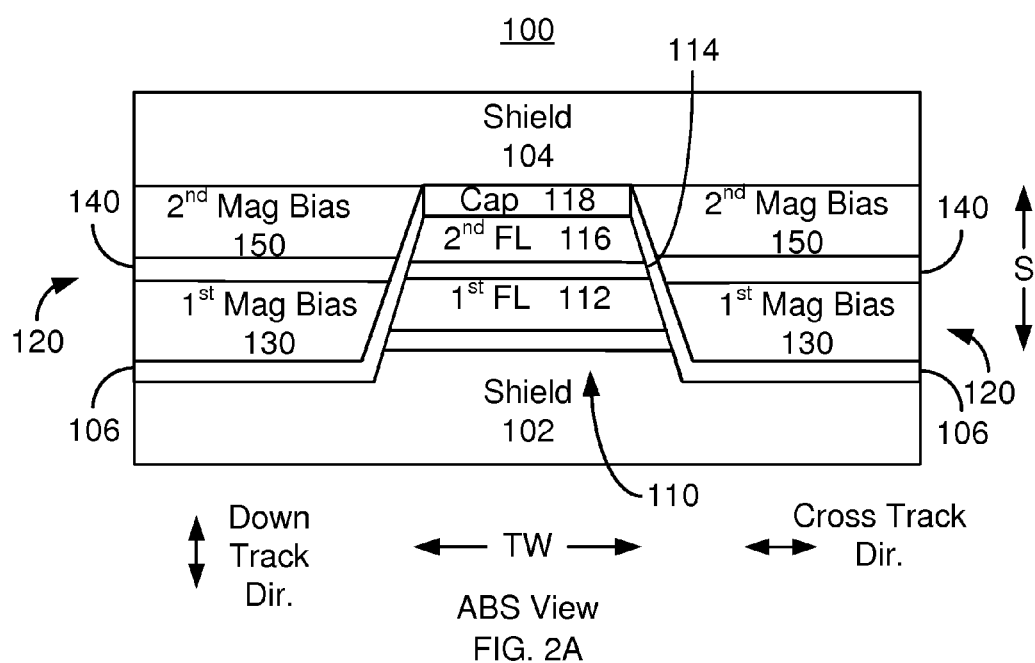
FIGS. 2A-2C depicts ABS, plan and side views of an exemplary embodiment of a portion of a dual free layer magnetic read transducer.
Figure 2B:
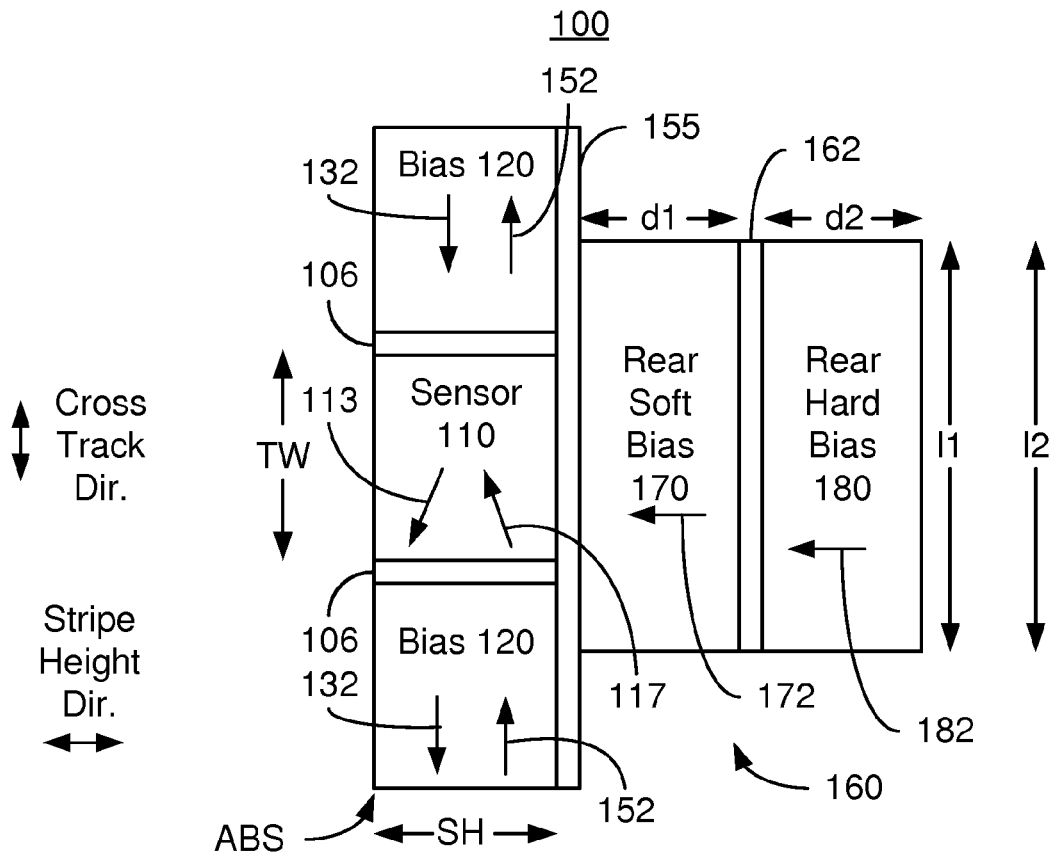
Figure 2C:
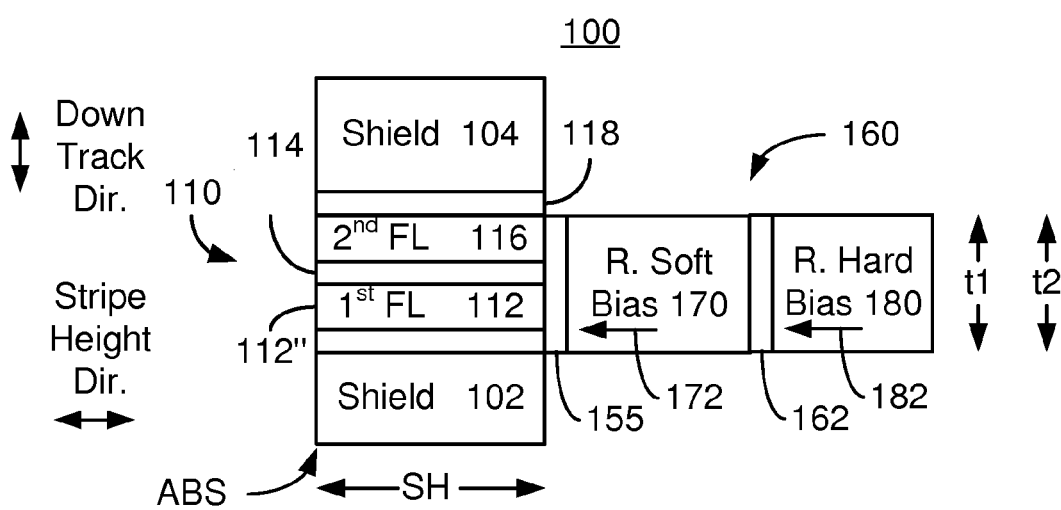

FIGS. 2A-2C depict ABS, plan and side views of an exemplary embodiment of a portion of a magnetic read transducer 100. For clarity, FIGS. 2A-2C are not to scale. The read transducer 100 may be part of a read head or may be part of a merged head that also includes a write transducer. The head of which the read transducer 100 is a part is contained in a disk drive having a media, a slider and the head coupled with the slider. Further, only a portion of the components of the read transducer 100 are depicted.

The transducer 100 includes optional soft magnetic shields 102 and 104, insulator 106, read sensor 110, side bias structures 130 and 150 and rear bias structure 160 that may be separated from the read sensor 110 by an insulating layer 155. The read sensor 110 includes a first free layer 112 and a second free layer 116 separated by a nonmagnetic spacer layer 114. The nonmagnetic spacer layer 114 may be conductive or an insulating tunneling barrier layer, such as MgO. The read sensor 110 is, therefore, a giant magnetoresistive or tunneling magnetoresistive read sensor in the embodiment shown. The free layers 112 and 116 are ferromagnetic and may include multiple layers. However, there is no AFM layer or pinned layer in the sensor 110. Instead, the free layers 112 and 116 are biased such that their magnetic moments 113 and 117, respectively are in a scissor mode. Based on the angle between the magnetic moments 113 and 117, the resistance of the read sensor 110 changes. This angle changes when the read 110 is under the influence of an external field, for example due to a bit being read. Thus, the resistance of the read sensor 110 may be used to read data. The read sensor 110 may also be configured for high density recording. Thus, in some embodiments, the track width (TW) of the read sensor 110 is not more than thirty nanometers. In some such embodiments, the track width is not more than twenty nanometers. In the embodiment shown, the shields 102 and 104 and the free layers 112 and 116 all have a stripe height, SH, in the stripe height direction. In other embodiments, however, different structures 102, 104, 112 and 116 may have different stripe heights.

The transducer 100 includes side magnetic bias structures 120 and a rear magnetic bias structure 160 that together magnetically bias the free layers 112 and 116 in a scissor mode. As can be seen in FIGS. 2A and 2B, the side bias structures 120 bias the magnetic moments 113 and 117, respectively, of the free layers 112 and 116, respectively, parallel to the ABS, in the cross-track direction. The magnetic bias structures 120 and free layers 112 and 116 are also configured to bias the magnetic moments 113 and 117 of the free layers 112 and 116, respectively, antiparallel. In some embodiments, the magnetic moments 113 and 117 of the free layers 112 and 116 are antiferromagnetically coupled. The rear magnetic bias structure 160 biases the magnetic moments 113 and 117 of the free layers 112 and 116, respectively, perpendicular to the ABS, in the stripe height direction.

Each bias structure 120 includes two magnetic bias structures 130 and 150 separated by a nonmagnetic structure 140. The first magnetic bias structure 130 magnetically biases the free layer 112 and, therefore, is adjacent to the sides of the free layer in the cross-track direction. Similarly, the second magnetic bias structure 150 magnetically biases the free layer 116 and is thus adjacent to the side of the free layer 116 in the cross-track direction. In the embodiment shown, the top surface of the first magnetic bias structure 130 is not higher than the upper surface of the first free layer 112. However, in other embodiments, the top surface of the magnetic bias structure 130 may be at another location. In some embodiments, the top surface of the first magnetic bias structure 130 is not higher than the lower surface of the second free layer 116. In other embodiments, the top surface of the first magnetic bias structure 130 is not higher than midway between the upper and lower surfaces of the second free layer 116. Although the top of the first magnetic bias structure 130 may be higher than bottom of the second free layer 116, the entire magnetic bias structure 130 is still lower than the second magnetic bias structure 150. Similarly, the bottom surface of the second magnetic bias structure 150 is not lower than the lower surface of the second free layer 116 in the embodiment depicted in FIGS. 2A-2C. However, in other embodiments, the bottom surface of the magnetic bias structure 150 may be at another location. For example, the bottom surface of the second magnetic bias structure 150 may not be lower than the upper surface of the first free layer 112. In other embodiments, the bottom surface of the magnetic bias structure 150 is not lower than midway between the upper and lower surfaces of the first free layer 112. Although the bottom of the second magnetic bias structure 150 may be lower than upper surface of the first free layer 112, the entire magnetic bias structure 150 is still higher than the first magnetic bias structure 130.

The magnetic bias structures 130 and 150 may take various forms. In some embodiments, both the first magnetic bias structure 130 and the second magnetic bias structure 150 are soft magnetic structures. For example, the magnetic bias structures 130 and 150 may be an alloy, multilayer or other structure that has a coercivity of not more than ten Oe. In some such embodiments, the soft magnetic bias structure(s) 130 and/or 150 have a coercivity of not more than five Oe. For example, the magnetic bias structures 130 and 150 may include CoFe and/or NiFe. In other embodiments, the magnetic bias structures 130 and/or 150 may have different magnetic properties. In some embodiments, the magnetic bias structure 130 and/or 150 may be a hard bias structure. For example, the first magnetic bias structure 130 may be an alloy or multilayer that has a sufficiently high coercivity to have its magnetic moment 132 substantially unchanged during operation of the transducer 100. In other embodiments, the first magnetic bias structure 130 may be a pinned structure. In such an embodiment, the first magnetic bias structure 130 may include a pinning layer, such as an antiferromagnetic (AFM) layer and a soft magnetic layer adjoining the pinning layer. In still other embodiments, the magnetic bias structure 130 and 150 may be configured in another manner. For example, the shield 102 is shown as being overmilled to allow for the soft bias structures 130 and 150. However, in other embodiments, the shield 102 may not be overmilled.

The first magnetic bias structure 130 may have a magnetic moment 132. The second magnetic bias structure 152 may have a magnetic moment 152. As can be seen in FIG. 2B, the magnetic moments 132 and 152 are antiferromagnetically aligned. Stated differently, the steady state orientation of the magnetic moments 132 and 152 is antiparallel. In some embodiments, the bias structures 130 and 150, and thus the magnetic moments 132 and 152, are antiferromagnetically coupled. Because of the orientations of the magnetic moments 132 and 152, the magnetic moment 113 of the first free layer 112 is biased in one direction, while the magnetic moment 117 of the second free layer 116 is biased in the opposite direction.

The magnetic transducer 100 also includes a rear bias structure 160 that is depicted as including soft bias structure 170 and hard bias structure 180. The read sensor 110 is between the rear bias structure 160 and the ABS. Further, an insulating layer 155 may separate the rear bias structure 160 from the sensor 110 and bias structures 120. In addition, although the shields 102 and 104 are shown as extending only to the stripe height of the sensor 110, the shields 102 and 104 generally extend significantly further in the stripe height direction. However, the shields 102 and 104 are also magnetically decoupled from the rear bias structure 160. Thus, the insulating layer 155 and the top insulating (not shown) may extend along the depth of the rear bias structure 160. For example, in some embodiments, the insulating layer 155 is at least ten Angstroms and not more than forty Angstroms thick. The insulating layer 155 is also nonmagnetic. Thus, the read sensor 110 may be electrically insulated from the rear bias structure 160 and not exchanged coupled with the rear soft bias structure 160. Although not depicted in FIGS. 2A-2C, an insulating capping layer may also be provided on top of the rear bias structure 160. In the embodiment shown, a nonmagnetic layer 162 is between the rear soft bias magnetic structure 170 and the rear hard bias structure 180. In other embodiments, the nonmagnetic layer 162 might be omitted. The rear bias structure 160 is shown as extending past the edges of the bias structures 120 closest to the sensor 110 in the cross-track direction. However, in other embodiments, the rear bias structure 160 may extend a different amount in the cross-track direction. Thus, the rear bias structure 160 is adjacent to the rear surface of the read sensor 110. The rear surface of the read sensor 110 is opposite to the ABS-facing surface.

The rear bias structure 160 includes at least a rear soft bias structure 170 and may include a rear hard bias structure 180. The rear soft bias structure 170 is between the rear hard bias structure 180 and the sensor 110 as well as between the rear hard bias structure 180 and the ABS. The rear hard bias structure 180 may be a hard magnetic alloy, for example having a coercivity in excess of two hundred Oersted. In some embodiments, the coercivity is greater than one thousand Oersted. For example, a CoPt alloy might be used. In other embodiments, the rear bias structure 180 may be a multilayer or other structure that functions as a hard bias structure. In other embodiments, the rear hard bias structure 180 may be omitted. The rear hard bias structure 180 has a length l2, a thickness t2 and a depth d2. In some embodiments, the rear hard bias structure 180 is separated from the rear soft bias structure 170 by the nonmagnetic layer 162. The nonmagnetic layer 162 may be conductive. In some embodiments, the thickness of the nonmagnetic layer 162 in the stripe height direction is at least ten Angstroms and not more than forty Angstroms.

The rear soft bias structure 170 has a length l1, a thickness t1 and a depth d1. Although the lengths, depths and thicknesses of the structures 170 and 180 are shown as being the same, in other embodiments, the geometries of the structures 170 and 180 may differ. However, at least the rear soft bias structure 170 is desired to be at least as wide as the track width of the sensor 110 (l1 TW). The rear soft bias structure 170 includes at least one soft material. For example, a soft magnetic alloy such as $Ni_{1-x}Fe_x$ and/or $Co_{1-y}Fe_y$, where x is at least 0.18-0.20 and y=0.09-0.11, might be used for the rear soft bias structure 170. Thus, the coercivity of the rear soft bias structure 170 is less than one hundred Oersted. In some embodiments, the coercivity of the rear soft bias structure 170 is less than ten Oersted. Further, the rear soft bias structure 170 provides sufficient moment to bias the magnetic moments 113 and 117 of the free layers 112 and 116, respectively. For example, in some embodiments, the rear soft bias structure has a saturation magnetization-thickness product of at least one milli-emu/cm$^2$ and not more than three milli-emu/cm$^2$. In some such embodiments, the saturation magnetization-thickness product is not more than two milli-emu per cm$^2$. The thickness used in the saturation magnetization-thickness product is t1, the depth of the rear soft bias structure 170 in the down track direction. Although shown with rear hard bias structure 180, the rear soft bias structure might be used alone in some embodiments or in conjunction with another mechanism, such as an adjoining antiferromagnetic layer, that biases the magnetic moment 172 as shown.

The rear soft bias structure 170 has a magnetic moment 172 that biases the free layers 112 and 116 in a direction perpendicular to the bias direction from the magnetic bias structures 130 and 150. In the embodiment shown, this direction is perpendicular to the ABS. Similarly, the rear hard bias structure 180 has a magnetic moment 182 in a direction perpendicular to the ABS. Without the rear bias structure 160, the free layers 112 and 116 may be biased antiparallel. However, because the structures 130, 150 and 160 all magnetically bias the free layers 112 and 116, the free layers 112 and 116 are biased such that the magnetic moments 113 and 117 are in a scissor mode.

The magnetic transducer 100 may be suitable for use in high density magnetic recording applications, for example those having a sensor track width of not more than thirty nanometers. The read sensor 110 does not include an antiferromagnetic layer or a pinned layer. Consequently, the shield-to-shield spacing (S) between the shields 102 and 104 may be reduced. The use of the scissor mode may also enhance the read signal. This scissor mode may be more reliably achieved because of the presence of the soft bias structure 170. If the hard bias structure 180 is used alone, the hard bias structure 180 is subject to clustering of the permanent magnet materials. Although the overall magnetic moment 182 of the rear hard bias structure 180 is out of the ABS, as shown in FIGS. 2B and 2C, individual clusters may have their magnetic moments aligned in a different direction. For example, the magnetic moment of a cluster may be substantially parallel to the ABS or antiparallel to the magnetic moment 182. These clusters may be on the order of the size of the track width for lower track widths/high density recording applications. The cluster(s) aligned with the read sensor in the cross-track direction may be magnetized in a direction other than the desired direction of the magnetic moment 182. Thus, the read sensor 110 would not be biased as desired. Use of the rear soft bias structure 170 addresses this issue. The rear soft bias structure 170 may be seen as smoothing out the variations in magnetization due to clustering of the rear hard bias structure 180. This is because the rear soft bias structure 170 may not be subject to such clustering. When used without the rear hard bias structure 180, the rear soft bias structure 170 may still bias the free layers 112 and 116 in a direction perpendicular to the ABS. The desired scissor mode may be achieved and performance may be improved.

Figure 3A:
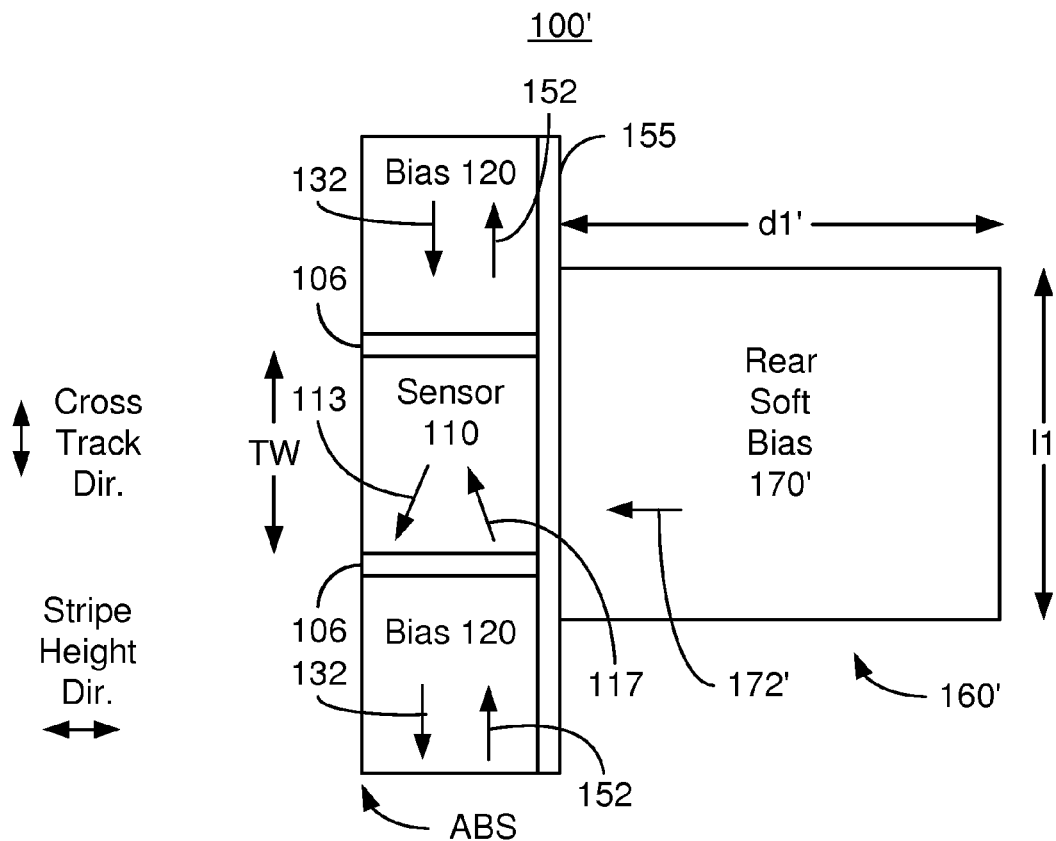
FIGS. 3A-3B depict plan and side views of another exemplary embodiment of a portion of a dual free layer magnetic read transducer.
Figure 3B:
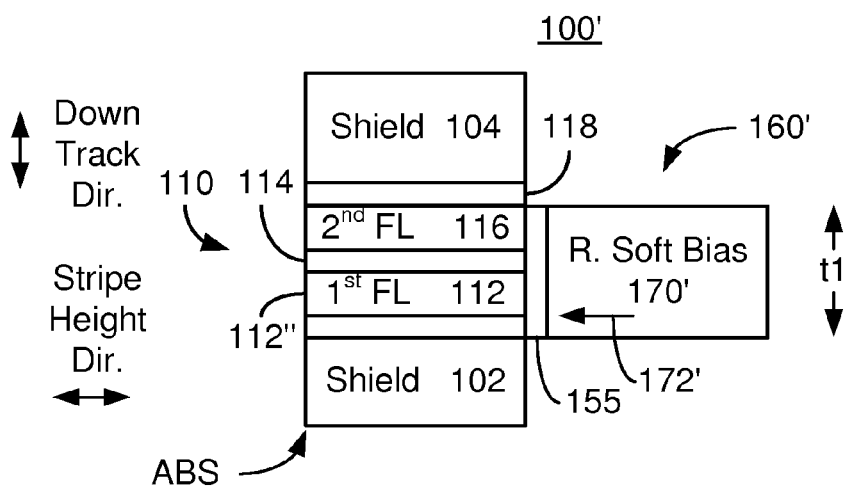

FIGS. 3A and 3B depict various views of another embodiment of a magnetic read transducer 100'. FIG. 3A depicts a plan view of an exemplary embodiment of the transducer 100'. FIG. 3B depicts a side view of the transducer 100'. For clarity, FIGS. 3A and 3B are not to scale. The read transducer 100' may be part of a read head or may be part of a merged head that also includes a write transducer. The head of which the read transducer 100' is a part is part of a disk drive having a media, a slider and the head coupled with the slider. The transducer 100' corresponds to the transducer 100. Consequently, analogous components are labeled similarly. For example, the transducer 100' includes a read sensor 110 having free layers 112 and 116 separated by a nonmagnetic spacer layer 114 that are analogous to such structures in the transducer 100. Thus, the components 102, 104, 110, 112, 114 116, 155, 160' and 170' have a similar structure and function to the components 102, 104, 110, 112, 114 116, 155, 160 and 170, respectively, depicted in FIGS. 2A-2C. Further, although an ABS view is not shown, the transducer 100' may appear substantially the same from the ABS as the transducer 100. The transducer 100' may also include structures analogous to the structures 120, 130, 140 and 150 depicted in FIGS. 2A-2C.

In the embodiment shown in FIGS. 3A-3B, the rear hard bias structure 180 has been omitted. In some embodiments, an antiferromagnetic layer or other biasing mechanism could also be included. For example, an antiferromagnetic layer may reside above or below (in the down track direction from) and adjoin the rear soft bias structure 170', may be behind (in the stripe height direction from) and adjoin the rear soft bias structure 170' or both. In such embodiments, the additional biasing mechanism may bias (or assist in biasing) the magnetization 172' of the rear soft bias structure 170' to be stable as shown. In other embodiments, only the rear soft bias structure 170' might be present. Thus, the rear bias structure 160' consists of the rear soft bias structure 170'. In such embodiments, the rear soft bias structure 170' may be configured such that the magnetization 172' is stable perpendicular to the ABS. For example, the rear soft bias structure 170' may have an anisotropy such that the magnetization 172' is stable during operation of the magnetic read transducer 100'. For example, a crystalline and/or shape anisotropy may be used to stabilize the magnetization 172'. In some embodiments, the depth, d1', of the rear soft bias structure 170' may be much greater than the length, l1, or height, t1, of the rear soft bias structure. In the embodiment shown, the height, t1, of the rear soft bias structure is shown as the same as that of the read sensor 110. The rear soft bias structure 170' is also shown as having a length, l1, greater than the track width but not extending to the edges of the side bias structures 120 in the cross-track direction. In other embodiments, other geometries are possible. However, the rear soft bias structure 170' is still desired to be at least as wide as the sensor 110 (l1≥TW).

The magnetic transducer 100' shares the benefits of the magnetic transducer 100. Performance and biasing of the sensor 110 may thus be improved. Further, processing might be simplified by the omission of the hard bias structure 180 and layer 162 separating the soft bias structure 170' from a hard bias structure.

Figure 4A:
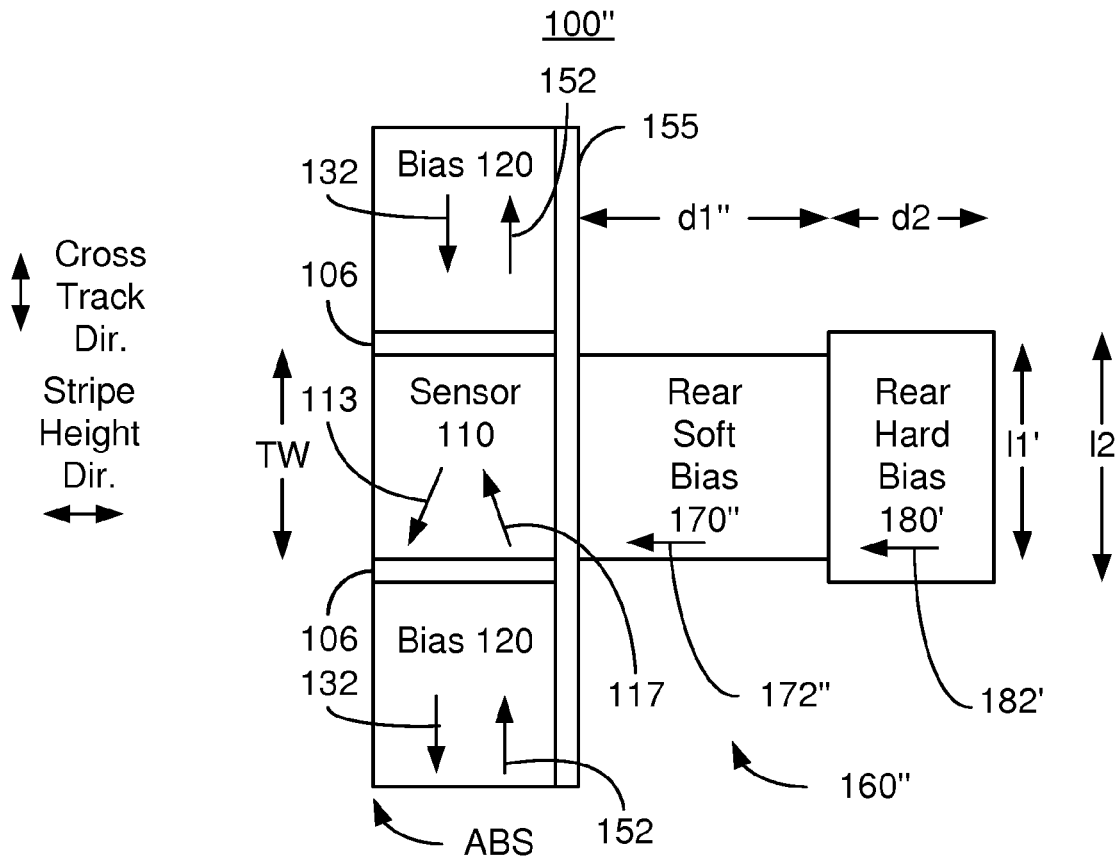
FIGS. 4A-4B depict plan and side views of another exemplary embodiment of a portion of a dual free layer magnetic read transducer.
Figure 4B:
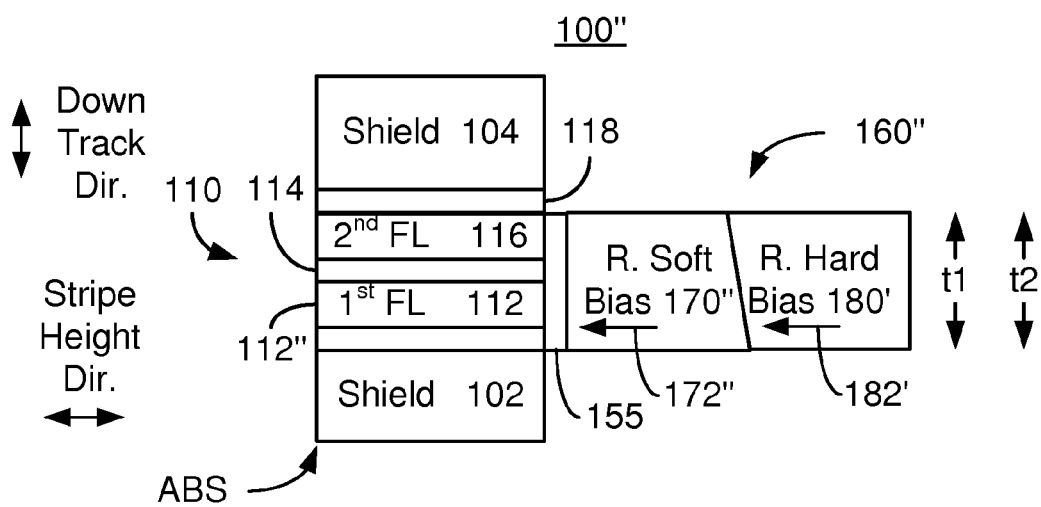

FIGS. 4A and 4B depict various views of another embodiment of a magnetic read transducer 100". FIG. 4A depicts a plan view of an exemplary embodiment of the transducer 100". FIG. 4B depicts a side view of the transducer 100". For clarity, FIGS. 4A and 4B are not to scale. The read transducer 100" may be part of a read head or may be part of a merged head that also includes a write transducer. The head of which the read transducer 100" is a part is part of a disk drive having a media, a slider and the head coupled with the slider. The transducer 100" corresponds to the transducer(s) 100 and/or 100'. Consequently, analogous components are labeled similarly. For example, the transducer 100" includes a read sensor 110 having free layers 112 and 116 separated by a nonmagnetic spacer layer 114 that are analogous to such structures in the transducer(s) 100 and/or 100'. Thus, the components 102, 104, 110, 112, 114 116, 155, 160", 170" and 180' have a similar structure and function to the components 102, 104, 110, 112, 114 116, 155, 160/160', 170/170' and 180, respectively, depicted in FIGS. 2A-2C and 3A-3B. Further, although an ABS view is not shown, the transducer 100" may appear substantially the same from the ABS as the transducer 100. The transducer 100" may also include structures analogous to the structures 120, 130, 140 and 150 depicted in FIGS. 2A-2C.

In the embodiment shown in FIGS. 4A-4B, the rear hard bias structure 180' and rear soft bias structure 170" have different geometries. In addition, the nonmagnetic layer 162 shown in FIGS. 2A-2C has been omitted. In the embodiment shown, the rear soft bias structure 170" has a length, l1' in the cross track direction, while the hard bias structure 180' has length l2' in the cross track direction. Thus, the rear hard bias structure 180' is wider than the rear soft bias structure 170". The thicknesses, t1 and t2, of the bias structures 170" and 180' are shown as the same. However, in other embodiments, the thicknesses may differ. In addition, it is noted that the interface between the rear soft bias structure 170" and the rear hard bias structure 180' is not parallel to the ABS. This is because during fabrication, the rear soft bias structure 170" may be ion milled to allow for refill with the material(s) for the rear hard bias structure 180'. Although not shown in the remaining drawings, this angle may be present in other embodiments. The rear bias structures 170" and 180' still have their magnetic moments 172" and 182', respectively, perpendicular to the ABS to bias the free layers 112 and 116 into a scissor state.

The magnetic transducer 100" shares the benefits of the magnetic transducer(s) 100 and/or 100'. Further, omission of a nonmagnetic layer between the soft bias structure 170" and the hard bias structure 180' may improve coupling between the structures 170" and 180'. Performance and biasing of the sensor 110 may thus be improved.

Figure 5A:
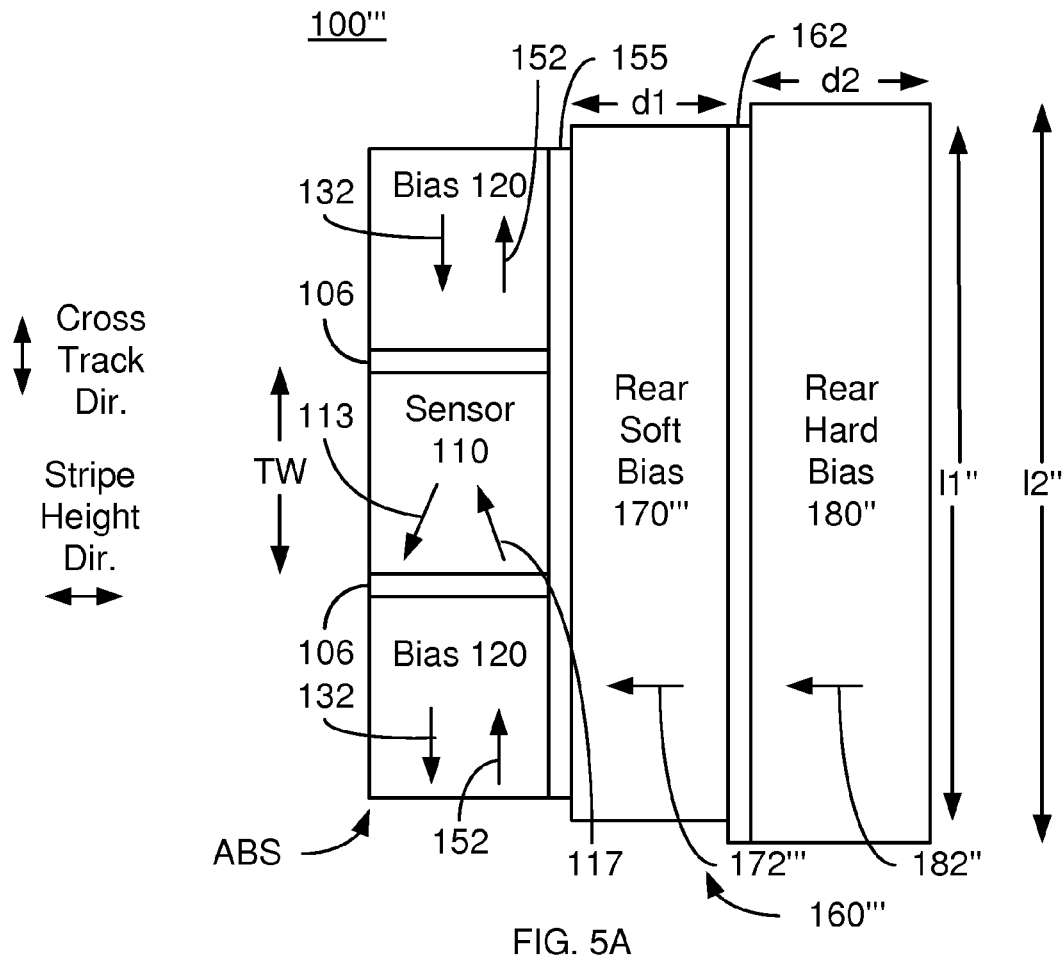
FIGS. 5A-5B depict plan and side views of another exemplary embodiment of a portion of a dual free layer magnetic read transducer.
Figure 5B:
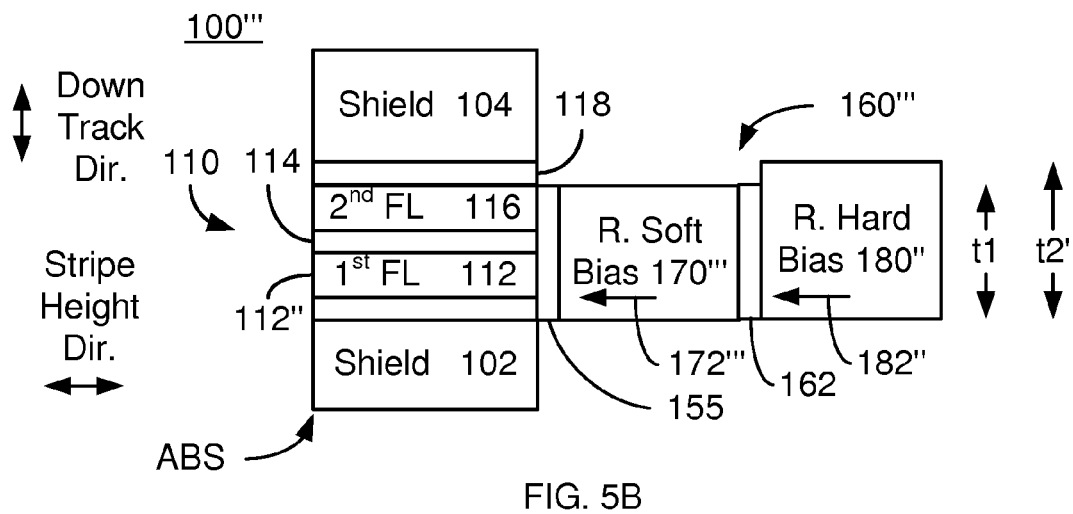

FIGS. 5A and 5B depict various views of another embodiment of a magnetic read transducer 100'''. FIG. 5A depicts a plan view of an exemplary embodiment of the transducer 100'''. FIG. 5B depicts a side view of the transducer 100'''. For clarity, FIGS. 5A and 5B are not to scale. The read transducer 100''' may be part of a read head or may be part of a merged head that also includes a write transducer. The head of which the read transducer 100''' is a part is part of a disk drive having a media, a slider and the head coupled with the slider. The transducer 100''' corresponds to the transducer(s) 100, 100' and/or 100". Consequently, analogous components are labeled similarly. For example, the transducer 100''' includes a read sensor 110 having free layers 112 and 116 separated by a nonmagnetic spacer layer 114 that are analogous to such structures in the transducer(s) 100, 100' and/or 100". Thus, the components 102, 104, 110, 112, 114 116, 155, 160''', 162, 170''' and 180" have a similar structure and function to the components 102, 104, 110, 112, 114 116, 155, 160/160'/160", 162, 170/170'/170" and 180/180', respectively, depicted in FIGS. 2A-2C, 3A-3B and 4A-4B. Further, although an ABS view is not shown, the transducer 100''' may appear substantially the same from the ABS as the transducer 100. The transducer 100''' may also include structures analogous to the structures 120, 130, 140 and 150 depicted in FIGS. 2A-2C.

In the embodiment shown in FIGS. 5A-5B, the rear hard bias structure 180" and rear soft bias structure 170''' have different geometries. In the embodiment shown, the rear soft bias structure 170''' has a length, l1" in the cross track direction, while the hard bias structure 180" has length l2" in the cross track direction. Thus, the rear hard bias structure 180" is wider than the rear soft bias structure 170'''. Further, both structures 170''' and 180" extend further in the cross-track direction than the side bias structures 120. The thicknesses, t1 and t2', of the bias structures 170''' and 180" also differ. The rear bias structures 170''' and 180" still have their magnetic moments 172''' and 182", respectively, perpendicular to the ABS to bias the free layers 112 and 116 into a scissor state.

The magnetic transducer 100''' shares the benefits of the magnetic transducer(s) 100, 100' and/or 100". Performance and biasing of the sensor 110 may thus be improved.

Figure 6A:
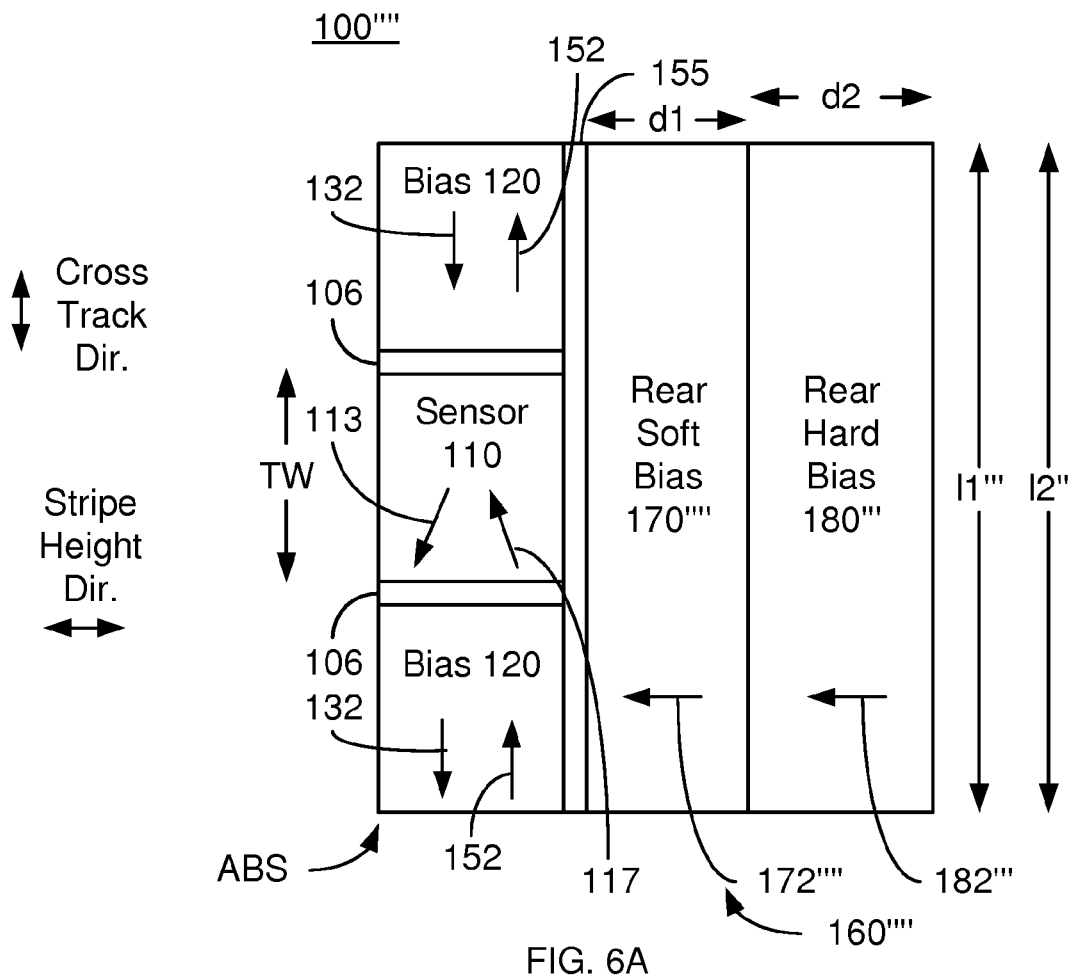
FIGS. 6A-6B depict plan and side views of another exemplary embodiment of a portion of a dual free layer magnetic read transducer.
Figure 6B:
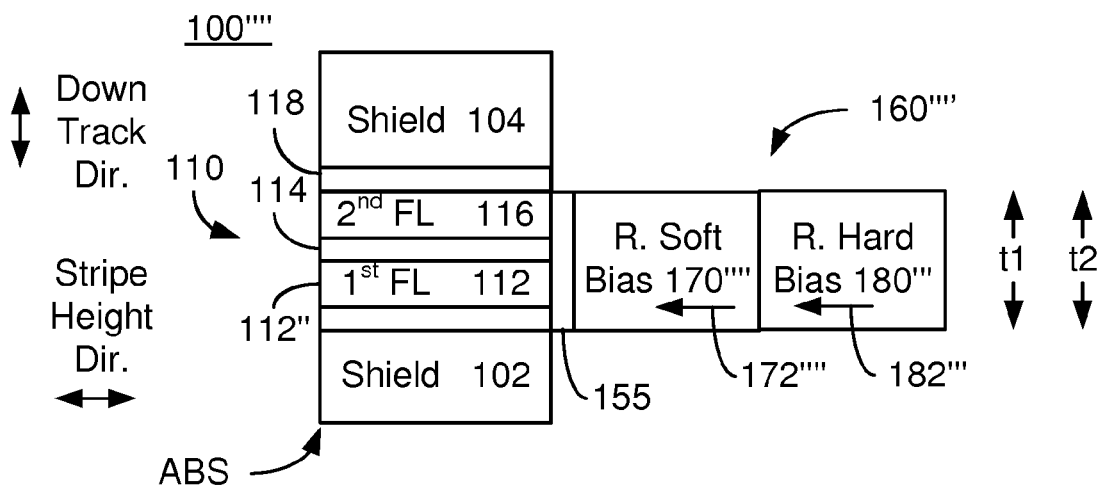

FIGS. 6A and 6B depict various views of another embodiment of a magnetic read transducer 100''''. FIG. 6A depicts a plan view of an exemplary embodiment of the transducer 100''''. FIG. 6B depicts a side view of the transducer 100''''. For clarity, FIGS. 6A and 6B are not to scale. The read transducer 100'''' may be part of a read head or may be part of a merged head that also includes a write transducer. The head of which the read transducer 100'''' is a part is part of a disk drive having a media, a slider and the head coupled with the slider. The transducer 100'''' corresponds to the transducer(s) 100, 100', 100" and/or 100'''. Consequently, analogous components are labeled similarly. For example, the transducer 100'''' includes a read sensor 110 having free layers 112 and 116 separated by a nonmagnetic spacer layer 114 that are analogous to such structures in the transducer(s) 100, 100', 100" and/or 100'''. Thus, the components 102, 104, 110, 112, 114 116, 155, 160'''', 170'''' and 180''' have a similar structure and function to the components 102/102', 104, 110, 112, 114 116, 155, 160/160/160"/160''', 170/170/170"/170''' and 180/180', respectively, depicted in FIGS. 2A-2C, 3A-3B, 4A-4B and 5A-5B. Further, although an ABS view is not shown, the transducer 100'''' may appear substantially the same from the ABS as the transducer 100. The transducer 100'''' may also include structures analogous to the structures 120, 130, 140 and 150 depicted in FIGS. 2A-2C.

In the embodiment shown in FIGS. 6A-6B, the rear soft bias structure 170'''' and the rear hard bias structure 180''' share an interface (i.e. nonmagnetic layer 162 is omitted). The rear bias structures 170'''' and 180''' also share geometries (l1'''=l2''', t1=t2, d1=d2). In other embodiments, the geometries may differ. The rear bias structures 170'''' and 180''' still have their magnetic moments 172'''' and 182''', respectively, perpendicular to the ABS to bias the free layers 112 and 116 into a scissor state.

The magnetic transducer 100'''' shares the benefits of the magnetic transducer(s) 100, 100', 100" and/or 100'''. Performance and biasing of the sensor 110 may thus be improved.

The magnetic transducers 100, 100', 100", 100''' and 100'''' have been shown with various configurations to highlight particular features, such as differences in geometries. One of ordinary skill in the art will readily recognize that two or more of these features may be combined in various manners consistent with the method and system described herein that are not explicitly depicted in the drawings.

Figure 7:
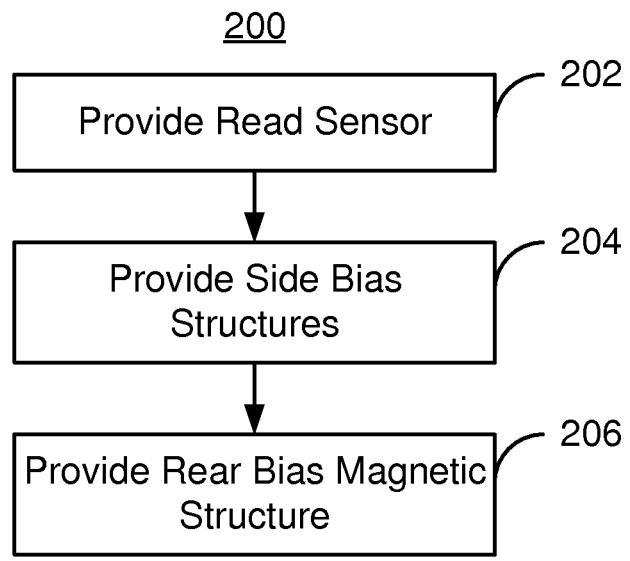
FIG. 7 is flow chart depicting an exemplary embodiment of a method for providing a magnetic recording read transducer.

FIG. 7 is an exemplary embodiment of a method 200 for providing a read transducer. For simplicity, some steps may be omitted, interleaved, combined, have multiple substeps and/or performed in another order unless otherwise specified. The method 200 is described in the context of providing a magnetic recording disk drive and transducer 100. However, the method 200 may be used in fabricating the transducer 100', 100", 100''' and/or 100''''. The method 200 may be used to fabricate multiple magnetic read heads at substantially the same time. The method 200 may also be used to fabricate other magnetic recording transducers. The method 200 is also described in the context of particular layers. A particular layer may include multiple materials and/or multiple sub-layers. The method 200 is described in the context of a disk drive. However, the method may be used in other applications employing a magnetoresistive and bias structures. The method 200 also may start after formation of other portions of the magnetic recording transducer.

The read sensor 110 is provided, via step 202. Step 202 may include depositing a stack of layers for the read sensor and defining the read sensor in the cross-track and stripe height directions. Further, the shield 102 and insulating layer 106 may also be provided. The side bias structures 120 are provided, via step 204. Step 204 is performed after the read sensor is defined in the cross-track direction. Thus, at least part of step 202 is performed before step 204. Step 204 may include depositing the insulating layer 106, depositing the material(s) for the magnetic bias structures 130 and 170, depositing the nonmagnetic layer 140. A mill step and planarization, such as a chemical mechanical planarization (CMP) may also be performed.

The rear bias structure 160 is provided, via step 208. Step 208 may be performed after the sensor 110 has been defined in at least the stripe height direction. Step 208 includes providing at least the soft bias structure 170. The hard bias structure 180 and optional nonmagnetic layer 162 may also be provided in step 206.

Using the method 200, the transducers 100, 100', 100", 100''' and/or 100'''' may be fabricated. Thus, the benefits of one or more of the transducers 100, 100', 100", 100''', and/or 100'''' may be achieved. Consequently, biasing of the free layers 112 and 116 in the read sensor 110 may be improved.

Figure 8:
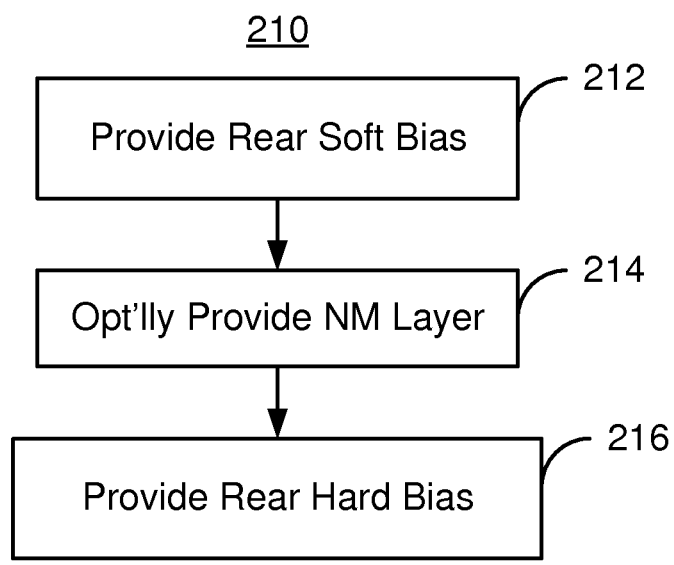
FIG. 8 is flow chart depicting another exemplary embodiment of a method for providing a magnetic recording read transducer.

FIG. 8 is an exemplary embodiment of a method 210 for providing a rear bias structure of a read transducer. For simplicity, some steps may be omitted, interleaved, combined, have multiple substeps and/or performed in another order unless otherwise specified. The method 210 is described in the context of providing a magnetic recording disk drive and transducer 100. However, the method 210 may be used in fabricating the transducer 100', 100", 100''' and/or 100''''. The method 210 may be used to fabricate multiple magnetic read heads at substantially the same time. The method 210 may also be used to fabricate other magnetic recording transducers. The method 210 is also described in the context of particular layers. A particular layer may include multiple materials and/or multiple sub-layers. The method 210 is described in the context of a disk drive. However, the method may be used in other applications employing a magnetoresistive and bias structures. The method 210 also may start after formation of other portions of the magnetic recording transducer.

The rear soft bias structure 170 is provided, via step 212. Step 212 may include depositing the layer(s) for the rear soft bias structure 170. In addition, the rear soft bias structure 170 may be defined in the stripe height direction. Thus, space may be made for the hard bias structure 180. Defining the soft bias structure 170 in the stripe height direction may include masking and ion milling the material(s) that have been deposited. In some embodiments, the length of the rear soft bias structure 170 in the cross-track direction may also be defined. This may occur when the soft bias structure 170 and the hard bias structure 180 are desired to have different lengths in the cross-track direction. In other embodiments, the lengths of the structures 170 and 180 may be defined together.

The nonmagnetic layer 172 may optionally be provided, via step 214. In other embodiments, step 214 may be omitted.

The rear hard bias structure 180 is provided, via step 216. Step 216 includes depositing the material(s) for the hard magnetic bias structure 180. In some embodiments, step 216 includes defining both bias structures 170 and 180 in the cross-track direction. In other embodiments, these features are separately defined.

Using the method 210, the rear bias structures 160, 160', 160", 160''' and/or 160'''' may be fabricated. Thus, the benefits of one or more of the transducers 100, 100', 100", 100''', and/or 100'''' may be achieved. Consequently, biasing of the free layers 112 and 116 in the read sensor 110 may be improved.

Figure 9:
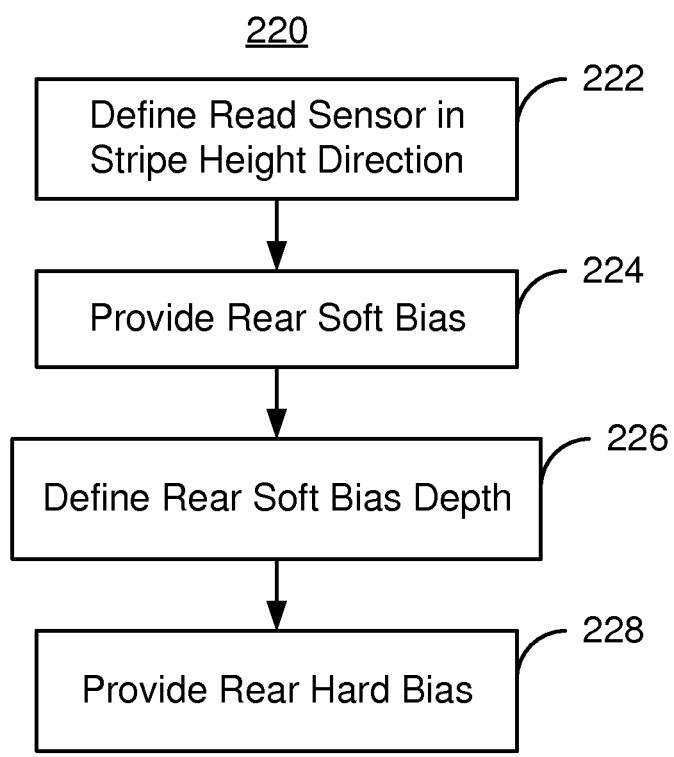
FIG. 9 is flow chart depicting another exemplary embodiment of a method for providing a magnetic recording read transducer.

FIG. 9 is an exemplary embodiment of a method 220 for providing a rear bias structure of a read transducer. For simplicity, some steps may be omitted, interleaved, combined, have multiple substeps and/or performed in another order unless otherwise specified. The method 220 is described in the context of providing a magnetic recording disk drive and transducer 100. However, the method 220 may be used in fabricating the transducer 100', 100", 100''' and/or 100''''. The method 220 may be used to fabricate multiple magnetic read heads at substantially the same time. The method 220 may also be used to fabricate other magnetic recording transducers. The method 220 is also described in the context of particular layers. A particular layer may include multiple materials and/or multiple sub-layers. The method 220 is described in the context of a disk drive. However, the method may be used in other applications employing a magnetoresistive and bias structures. The method 220 also may start after formation of other portions of the magnetic recording transducer.

The read sensor 110 is defined in the stripe height direction, via step 222. Step 222 may occur before or after the read sensor is defined in the cross-track direction. Step 222 may include masking and ion milling the read sensor stack. Step 222 may also include providing a nonmagnetic insulating layer 155.

The rear soft bias structure 170 is provided, via step 224. Step 224 may include depositing the layer(s) for the rear soft bias structure 170. In addition, the rear soft bias structure may be defined in the stripe height direction, via step 226. Thus, space may be made for the hard bias structure 180. Step 226 may include masking and ion milling the material(s) that have been deposited for the rear soft bias structure 170. In some embodiments, the length of the rear soft bias structure 170 in the cross-track direction may also be defined. The nonmagnetic layer 172 may optionally be provided.

The rear hard bias structure 180 is provided, via step 228. Step 228 includes depositing the material(s) for the hard magnetic bias structure 180. In some embodiments, step 228 includes defining both bias structures 170 and 180 in the cross-track direction. In other embodiments, these features are separately defined.

Using the method 220, the rear bias structures 160, 160', 160", 160''' and/or 160'''' may be fabricated. Thus, the benefits of one or more of the transducers 100, 100', 100", 100''', and/or 100'''' may be achieved. Consequently, biasing of the free layers 112 and 116 in the read sensor 110 may be improved.

We claim:

1. A magnetic read apparatus having an air-bearing surface (ABS) comprising:
   a read sensor including a first free layer having a first upper surface and a first lower surface, a spacer layer, and a second free layer having a second lower surface and a second upper surface, the spacer layer being nonmagnetic and residing between the upper surface of the first free layer and the lower surface of second free layer, the read sensor having a rear surface opposite to the ABS;
   a side bias structure adjacent to at least one side surface of the read sensor, the side bias structure being configured to magnetically bias the first free layer and the second free layer to be antiferromagnetically aligned; and
   a rear magnetic bias structure configured to bias the first free layer and the second free layer in a scissor mode, the read sensor being between the ABS and the rear magnetic bias structure, the rear magnetic bias structure including a rear soft magnetic bias structure having a saturation magnetization-thickness product of at least one milli-emu/cm$^2$ and not more than three milli-emu/cm$^2$.

2. The magnetic read apparatus of claim 1 wherein the read sensor has a track width of not more than thirty nanometers and wherein the rear soft magnetic bias structure has a width of at least thirty nanometers.

3. The magnetic read apparatus of claim 2 wherein the track width is not more than twenty nanometers and the width of the rear soft magnetic bias structure is at least twenty nanometers.

4. The magnetic read apparatus of claim 1 wherein the rear soft magnetic bias structure is a NiFe rear soft magnetic bias structure.

5. The magnetic read apparatus of claim 1 wherein the rear magnetic bias structure further includes a rear hard magnetic bias structure, the rear soft magnetic bias magnetic structure being between the read sensor and the rear hard magnetic bias structure.

6. The magnetic read apparatus of claim 5 wherein the rear soft magnetic bias structure has a soft bias width, the read sensor has a track width, the rear hard magnetic bias structure has a hard bias width and wherein the soft bias width is at least the track width and not more than the hard bias width.

7. The magnetic read apparatus of claim 5 wherein the rear hard magnetic bias structure is separated from the rear soft magnetic bias structure by at least ten Angstroms and not more than forty Angstroms.

8. The magnetic read apparatus of claim 1 wherein the rear soft magnetic bias structure is at least ten Angstroms and not more than forty Angstroms from the read sensor.

9. The magnetic read apparatus of claim 1 further comprising:
a bottom shield; and
a top shield, the read sensor residing between the bottom shield and the top shield.

10. The magnetic read apparatus of claim 9 wherein the rear soft bias structure is coupled to the bottom shield.

11. The magnetic read apparatus of claim 9 wherein the rear soft bias structure is coupled to the top shield.

12. The magnetic read apparatus of claim 1 wherein the saturation magnetization-thickness product is not more than two milli-emu per cm$^2$.

13. The magnetic read apparatus of claim 1 wherein the side bias structure further comprises a first magnetic structure, a second magnetic structure and a nonmagnetic structure between the first magnetic structure and the second magnetic structure, the first magnetic structure and the second magnetic structure being antiferromagnetically aligned.

14. The magnetic read apparatus of claim 1 wherein the rear soft bias structure has a depth in a stripe direction perpendicular to the ABS, width in a cross-track direction, and a height in a down-track direction, the depth being greater than the width and greater than the height.

15. A disk drive comprising:
at least one disk;
at least one slider including at least one magnetic transducer having an air-bearing surface (ABS), the at least one magnetic transducer including a read sensor, a side bias structure and a rear magnetic bias structure, the read sensor including a first free layer having a first upper surface and a first lower surface, a spacer layer, and a second free layer having a second lower surface and a second upper surface, the spacer layer being nonmagnetic and residing between the upper surface of the first free layer and the lower surface of second free layer, the read sensor having a rear surface opposite to the ABS, the side bias structure being adjacent to at least one side surface of the read sensor, the side bias structure being configured to magnetically bias the first free layer and the second free layer to be antiferromagnetically aligned, the rear magnetic bias structure being configured to bias the first free layer and the second free layer in a scissor mode, the read sensor being between the ABS and the rear magnetic bias structure, the rear magnetic bias structure including a rear soft magnetic bias structure having a saturation magnetization-thickness product of at least one milli-emu/cm$^2$ and not more than three milli-emu/cm$^2$.

16. A method for providing a magnetic read apparatus having an air-bearing surface (ABS) comprising:
providing a read sensor including a first free layer having a first upper surface and a first lower surface, a spacer layer, and a second free layer having a second lower surface and a second upper surface, the spacer layer being nonmagnetic and residing between the upper surface of the first free layer and the lower surface of second free layer, the read sensor having a rear surface opposite to the ABS;
providing a side bias structure adjacent to at least one side surface of the read sensor, the side bias structure being configured to magnetically bias the first free layer and the second free layer to be antiferromagnetically aligned; and
providing a rear magnetic bias structure configured to bias the first free layer and the second free layer in a scissor mode, the read sensor being between the ABS and the rear magnetic bias structure, the rear magnetic bias structure including a rear soft magnetic bias structure having a saturation magnetization-thickness product of at least one milli-emu/cm$^2$ and not more than three milli-emu/cm$^2$.

17. The method of claim 16 wherein the read sensor has a track width of not more than thirty nanometers and wherein the rear soft magnetic bias structure has a width of at least thirty nanometers.

18. The method of claim 17 wherein the step of providing the rear magnetic bias structure further includes:
providing a rear hard magnetic bias structure, the rear soft magnetic bias structure being between the read sensor and the rear hard magnetic bias structure.

19. The method of claim 18 wherein the step of providing the read sensor further includes defining a read sensor stripe height and wherein the step of providing the rear magnetic bias structure further includes:
depositing at least one soft magnetic bias structure layer;
defining a depth of the at least one soft magnetic bias structure; and
depositing at least one hard bias layer for the rear hard magnetic bias structure.

20. The method of claim 19 further comprising:
providing a bottom shield;
providing a top shield, the read sensor residing between the bottom shield and the top shield; and wherein the step of providing the rear magnetic bias structure further includes:
magnetically coupling the rear soft bias magnetic structure to the bottom shield or the top shield.

21. The method of claim 16 wherein the side bias structure further includes a first magnetic structure, a second magnetic structure and a nonmagnetic structure between the first magnetic structure and the second magnetic structure, the first magnetic structure and the second magnetic structure being antiferromagnetically aligned.

* * * * *